United States Patent
Kolanjery et al.

(10) Patent No.: US 12,224,880 B2
(45) Date of Patent: Feb. 11, 2025

(54) AUTOMOTIVE AUDIO BUS DATA COMMUNICATION PROTOCOL

(71) Applicant: GM Cruise Holdings LLC, San Francisco, CA (US)

(72) Inventors: Jitish Kolanjery, Milpitas, CA (US); Ashwin Raut, Cupertino, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 187 days.

(21) Appl. No.: 17/940,745

(22) Filed: Sep. 8, 2022

(65) Prior Publication Data

US 2024/0089144 A1    Mar. 14, 2024

(51) Int. Cl.
*H04L 12/40* (2006.01)
*B60W 60/00* (2020.01)

(52) U.S. Cl.
CPC ..... *H04L 12/40006* (2013.01); *B60W 60/001* (2020.02)

(58) Field of Classification Search
CPC ........................ H04L 12/40006; B60W 60/001
See application file for complete search history.

(56) References Cited

U.S. PATENT DOCUMENTS

| | | | |
|---|---|---|---|
| 2014/0025999 A1* | 1/2014 | Kessler | G06F 9/4411 710/110 |
| 2022/0046114 A1* | 2/2022 | Entelis | H04L 12/40 |

* cited by examiner

*Primary Examiner* — Zachary K Huson
(74) *Attorney, Agent, or Firm* — Dimitri Kirimis

(57) ABSTRACT

Systems and techniques are provided for communicating using an automotive audio bus. An example method can include receiving, by a first automotive audio bus manager, a request from a first automotive audio bus client for a first data transmission to a second automotive audio bus client, wherein a first size of the first data transmission exceeds a maximum data frame size; parsing the first data transmission into a first plurality of data frames based on the first size of the first data transmission and the maximum data frame size; sending a first header frame to a second automotive audio bus manager associated with the second automotive audio bus client, wherein the first header frame includes a first indication of a first incoming long message transmission and the first size of the first data transmission; and sending the first plurality of data frames to the second automotive audio bus manager.

12 Claims, 9 Drawing Sheets

| ID 442 | ID 444 | MESSAGE TYPE 446 | MESSAGE SIZE 448 |
|---|---|---|---|
| | | HDR CRC 450 | |
| MESSAGE SIZE 448 | | | |
| | | | MESSAGE CRC 452 |

AUTOMOTIVE AUDIO BUS DATA COMMUNICATION PROTOCOL

BACKGROUND

1. Technical Field

The present disclosure generally relates to vehicle communications, and, more specifically, to systems and methods for using an automotive audio bus to send and receive data packets having arbitrary lengths.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4A, FIG. 4B, and FIG. 4C are diagrams illustrating examples of frame structures for communicating using an automotive audio bus, in accordance with some examples of the present disclosure;

DETAILED DESCRIPTION

Figure 1:
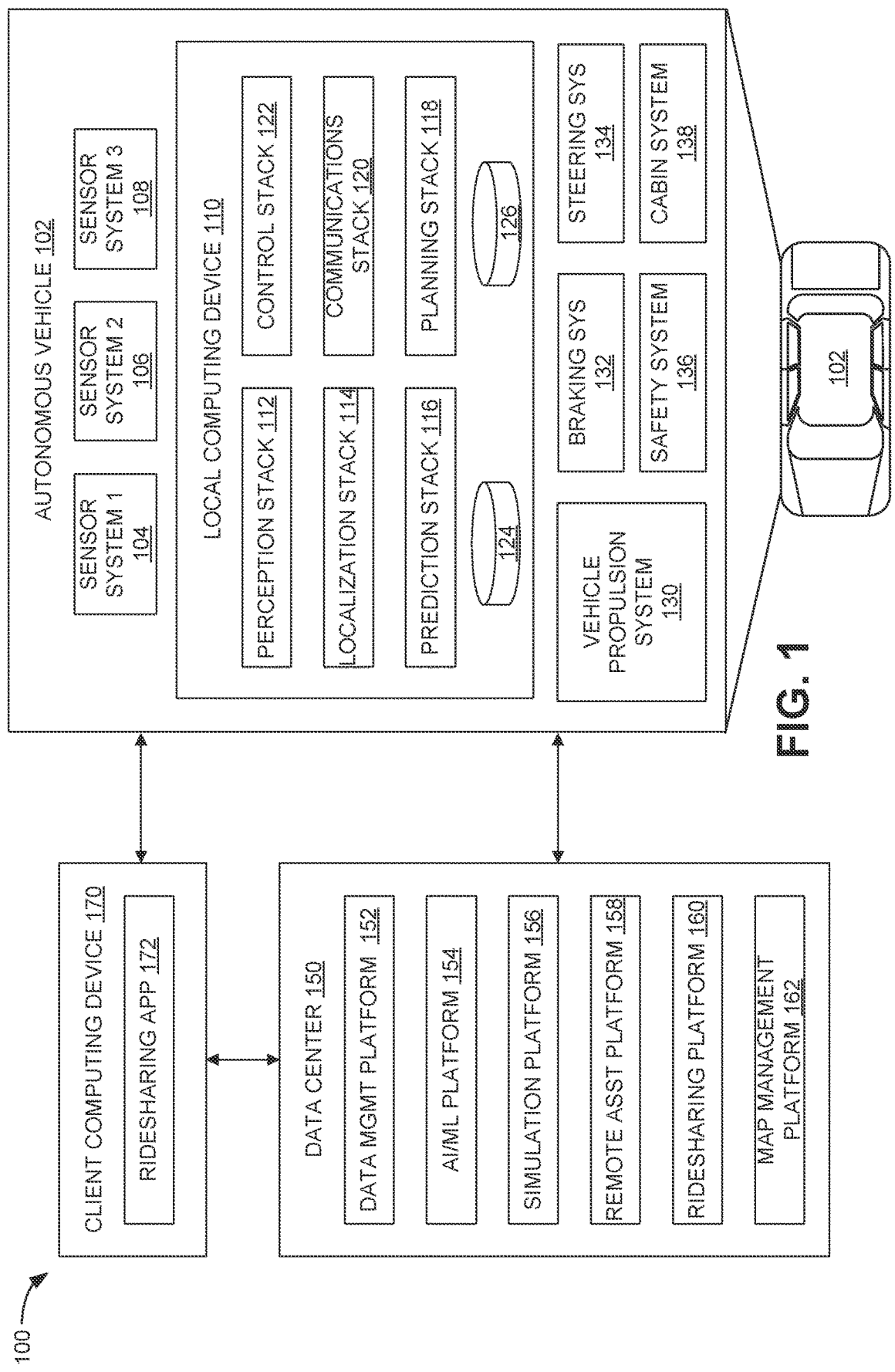
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, many of the hardware components on the AV can be configured to communicate with each other. For example, an autonomous driving system computer (ADSC) can be configured to communicate with the vehicle sensors and with diagnostic modules within the AV, among other components. In some examples, many of the hardware components in the AV can be connected using communication and/or networking protocols such as controller area network (CAN), vehicle area network (VAN), domestic digital bus (D2B), inter-integrated circuit (I²C), serial peripheral interface (SPI), automotive audio bus (A2B), and/or any other suitable communication and/or networking protocol. In some cases, a communication protocol such as A2B may be implemented using a daisy-chain configuration (e.g., using a 2-wire unshielded twisted pair cable) that can reduce the amount of wiring required to interconnect hardware components within the AV.

In some aspects, the automotive audio bus can be used to send and receive messages among different nodes that are connected to the bus. For example, an automotive audio bus provides a mailbox feature that accommodates messages that are relatively small (e.g., 32 bit maximum). In some cases, this limitation of the automotive audio bus inhibits communication among components that require higher bandwidth (e.g., send/receive greater amounts of data).

Systems and techniques are provided herein for implementing an automotive audio bus communication protocol that facilitates transmission of data packets with arbitrary length (e.g., greater than 32 bits). In some cases, the protocol can be implemented by an automotive audio bus manager that may parse data transmissions into smaller frames that can be sent using the automotive audio bus. In some aspects, the automotive audio bus manager can generate a large message header that provides an indication of an incoming long message transmission together with the total size of the data transmission. In some cases, an automotive audio bus manager that receives the large message header can use the information therein to receive and combine subsequent data packets to yield the data transmission. In some examples, the automotive audio bus manager can then send the data transmission to one or more automotive audio bus clients.

In some aspects, the systems and techniques described herein can be used to enable transmission/reception of data packets of arbitrary lengths using an existing framework for an automotive audio bus (e.g., A2B framework). In some examples, the present technology can be used to transmit customized (e.g., user-defined) message types such as diagnostic telemetry data, manufacturing trace data, software update acknowledgments (e.g., success/failure messages), etc. In some cases, the present technology may be implemented without any changes to hardware and/or firmware that is associated with the A2B framework.

FIG. 1 is a diagram illustrating an example autonomous vehicle (AV) environment 100 (sometimes referred to as an AV management system 100), according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
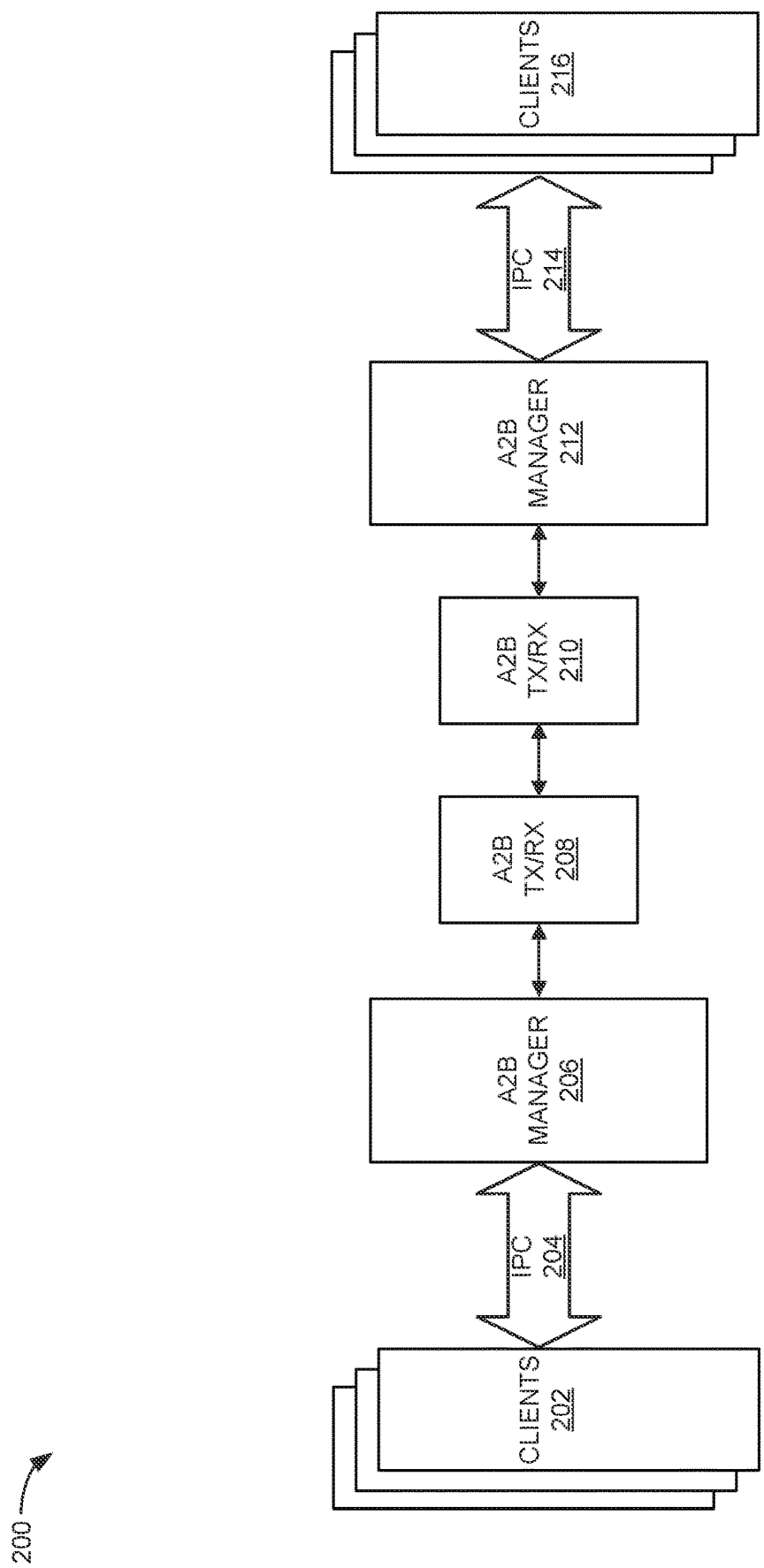
FIG. 2 is a diagram illustrating an example system for implementing communications using an automotive audio bus, in accordance with some examples of the present disclosure.

FIG. 2 illustrates an example system 200 for implementing communications using an automotive audio bus (A2B). In some aspects, the system 200 can include one or more A2B managers, such as A2B manager 206 and A2B manager 212. In some cases, A2B manager 206 and/or A2B manager 212 can correspond to a standalone process that can provide access to one or more A2B mailboxes for implementing A2B messaging among clients, as discussed further herein. In some examples, A2B manager 206 may communicate with A2B transceiver 208 (e.g., using a hardware interface such as an Inter-Integrated Circuit (I²C) interface). In some instances, A2B manager 212 may communicate with A2B transceiver 210 (e.g., using an I²C interface). In some aspects, A2B transceiver 208 and A2B transceiver 210 may be arranged in a daisy-chain configuration (e.g., A2B transceiver 208 and A2B transceiver 210 may communicated using a 2-wire unshielded twisted pair cable).

In some aspects, A2B manager 206 can communicate with one or more clients 202 using inter-process communication (IPC) 204. In some cases, A2B manager 212 may likewise communicate with one or more clients 216 using IPC 214. In some instances, clients 202 and/or clients 216 can include any client or process that can be configured to use A2B to communicate. In some cases, a client (e.g., clients 202 and/or clients 216) can include a software and/or a hardware module that transmits and/or receives data in an AV. In one illustrative example, an edge device diagnostic framework (EDDF) operating on a customer facing wireless module (CFWM) can be configured as part of clients 202 in order to send CFWM EDDF data (e.g., telemetry data) over A2B to a telematics and network gateway (TANG) that is configured as part of clients 216. Examples of data that the clients 202 may send/receive using A2B can include traceability information, software/hardware version checks, firmware update responses, webserver responses, representational state transfer (REST) communications, audio data, video data, image data, etc.

In some examples, clients 202 and/or clients 216 can access client libraries that can provide application programming interfaces (APIs) for communicating with A2B manager 206 and/or A2B manager 212. In some aspects, API signatures can be similar to a socket interface (e.g., connect, read, write). In some cases, the underlying IPCs (e.g., IPC 204 and/or IPC 214) may be wrapped by the client APIs (e.g., not visible to clients 202 and/or clients 216). In some instances, a process or client can link to the client library and make calls to the API.

In some aspects, clients 202 can register with A2B manager 206 to receive data packets of a particular type (e.g., diagnostic data, trace data, acknowledgment (ACK), negative acknowledgment (NACK), user-defined, etc.). For example, clients 202 can register to receive data packets having a particular message type field in the message header frame (e.g., see description of FIG. 4B below). In some cases, A2B manager 206 can keep track of clients 202 that have requested connectivity over A2B and the types of messages that clients 202 are interested in receiving (e.g., subscribed to based on a message type field). In some examples, an A2B manager (e.g., A2B manager 206 and/or A2B manager 212) can forward messages to clients (e.g., clients 202 and/or clients 216) based on the message type and the messages each client is subscribed to receive.

In some examples, A2B manager 206 and A2B manager 212 can facilitate communication between clients 202 and clients 216 over the A2B interface (e.g., using A2B transceiver 208 and/or A2B transceiver 210) by using an A2B mailbox feature. In some aspects, the A2B mailbox feature can include a virtual mailbox (e.g., register, memory location, etc.) that allows for inter-client communication. In some cases, the A2B mailbox feature may be implemented using one or more registers that are part of an A2B transceiver (e.g., A2B transceiver 208 and/or A2B transceiver 210).

In some aspects, the A2B mailbox feature may be implemented using a master/slave configuration. For example, A2B manager 206 may be configured as a master node and A2B manager 212 may be configured as a slave node. In one example, A2B manager 212 (e.g., slave node) can send a message over I²C to one or more registers (e.g., mailbox) in A2B transceiver 210 (e.g., slave node transceiver), and A2B manager 206 (e.g., master node) can read the message directly from the register in A2B transceiver 210. In another example, A2B manager 206 (e.g., master node) can use A2B transceiver 208 (e.g., master node transceiver) to write a message in a register in A2B transceiver 210 (e.g., slave node transceiver) that can be read by A2B manager 212 (e.g., slave node). In further examples, the master/slave configuration may be reversed (e.g., A2B manager 212 may be configured as the master node and A2B manager 206 may be configured as the slave node).

In some aspects, the A2B mailbox (e.g., register) that is used to store data associated with an A2B message may have a configurable size (e.g., 8 bits, 16 bits, 24 bits, or 32 bits). In some examples, a data transmission may exceed the maximum size associated with the A2B mailbox (e.g., data transmission may exceed 32 bits). For example, A2B manager 206 may receive a data transmission from one of clients 202 that exceeds the maximum size that can be sent using the A2B mailbox messaging feature. In some examples, an A2B manager (e.g., A2B manager 206 and/or A2B manager 212) can be configured to fragment and/or reconstruct data messages that are transmitted and/or received via the A2B interface. In some aspects, A2B manager can fragment or parse the data transmission to create a number of smaller data packets that can be sent using the A2B interface. In some examples, A2B manager 206 may also create a message header frame that can provide an indication to a receiver of an incoming large message transmission (e.g., multiple data packets that need to be reconstructed). In some cases, the message header frame may also include the total size of the data transmission (e.g., the aggregate size of all data packets in the large message transmission).

In some cases, A2B manager 212 may receive the message header frame followed by the multiple data packets. In some examples, A2B manager 212 can reconstruct the data transmission using the data fragments in the data packets and based on the total size as noted in the message header frame. In some instances, A2B manager 212 can forward the reconstructed data packet to one or more of clients 216.

Figure 3:
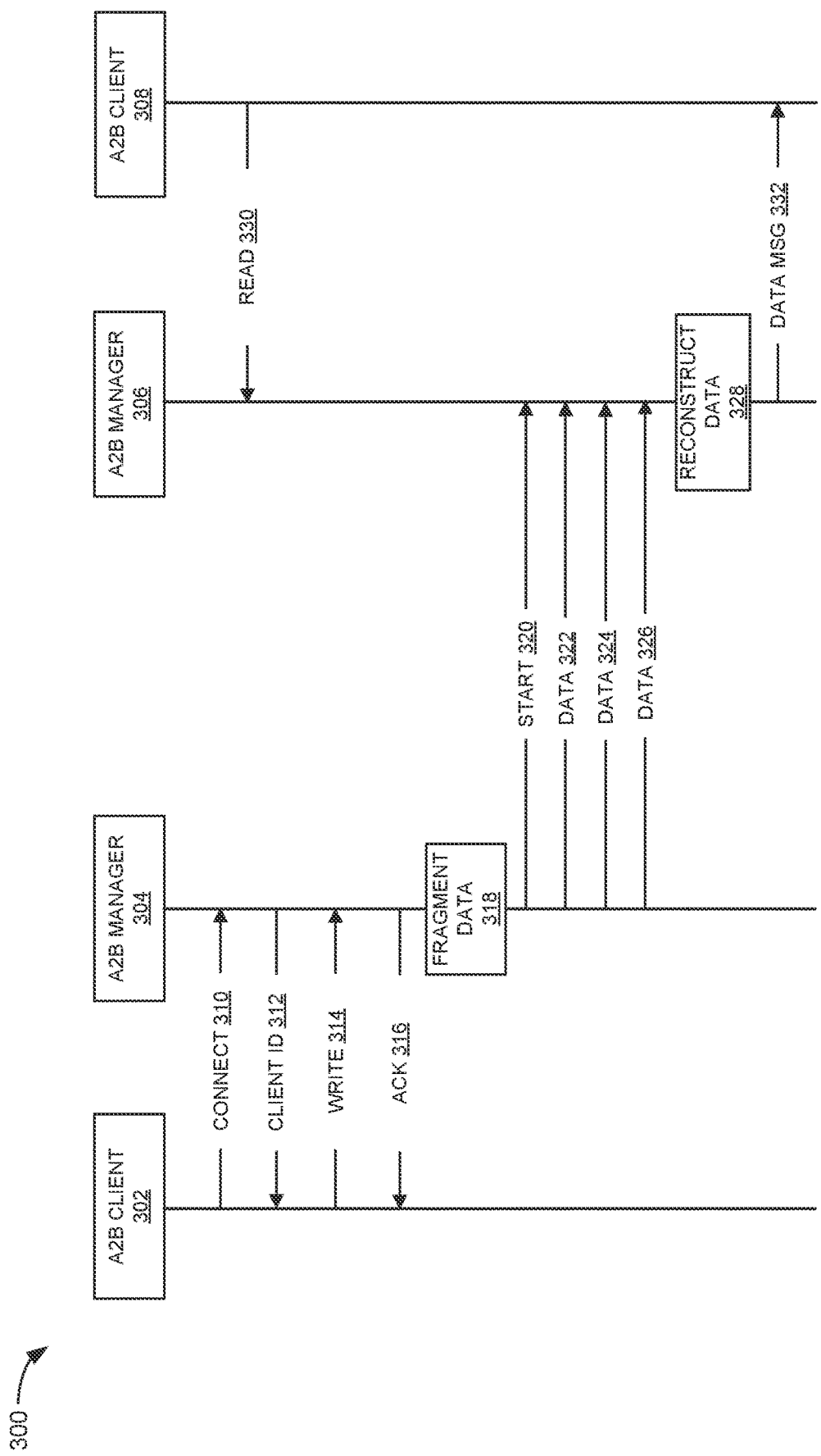
FIG. 3 is a sequence diagram illustrating an example sequence for performing communications using an automotive audio bus, in accordance with some examples of the present disclosure.

FIG. 3 is sequence diagram illustrating an example of a sequence 300 for performing communications using an automotive audio bus. The sequence 300 may be performed by automotive audio bus (A2B) client 302, A2B manager 304, A2B manager 306, and A2B client 308.

At action 310, A2B client 302 can send a connection/registration message to A2B manager 304. In some aspects, the connection/registration message can be used to register A2B client 302 with A2B manager 304. In some examples, the connection/registration message may specify a type of messages that A2B client 302 is subscribing to (e.g., a type of message that should be forwarded to A2B client 302 by A2B manager 304).

At action 312, A2B manager 304 can assign a client identifier (client ID) to A2B client 302. In some cases, A2B manager 304 can associate the client ID for A2B client 302 with one or more corresponding message types (e.g., message types to forward to A2B client 302). In some examples, the client ID can be used to identify data messages sent by A2B client 302 to A2B manager 304 for transmission over the A2B interface.

At action 314, A2B client 302 can send a write command to A2B manager 304. In some cases, the write command can be invoked by A2B client 302 as part of an API for transmitting data over the A2B interface. In some instances, the write command can include one or more parameters such as data (e.g., message buffer), data length, and/or data type. In some cases, the write command will send the one or more parameters over the IPC to A2B manager 304. At action 316, A2B manager 304 can send an acknowledgment (ACK) response to A2B client 302 indicating successful reception of the write command and its associated parameters (e.g., data, data length, data type, etc.).

Figure 4A:
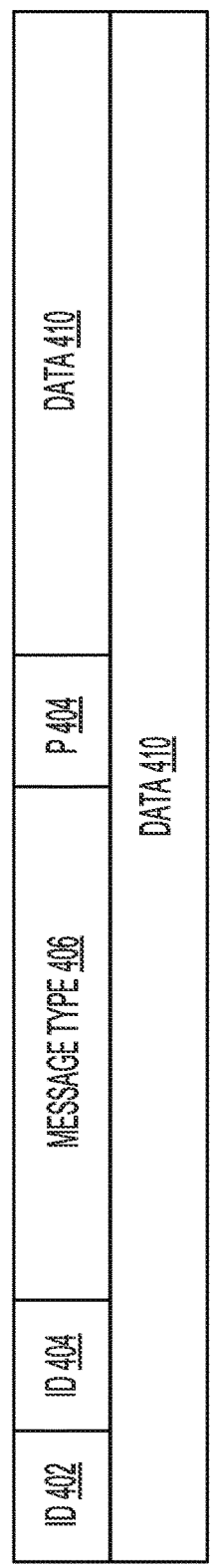

At action 318, A2B manager 304 can determine the size of the data transmission (e.g., received as part of the write command at action 314) and fragment the data into smaller data packets, if needed. In some cases, in which the data is less than or equal to 23 bits, A2B manager 304 may transmit the data using a condensed message frame. FIG. 4A illustrates an example of a condensed message frame 400. In some aspects, condensed message frame 400 can include two bits that identify frame 400 as a condensed message (e.g., field 402 and field 404 can set to a value of '11'). In some instances, condensed message frame 400 can include a message type field 406, a parity bit 408, and a data field 410.

In some aspects, the data transmission may exceed the payload size of condensed message frame 400. In some examples, A2B manager 304 can fragment the data transmission into multiple data frames. In some cases, A2B manager 304 can generate a long message header frame that can be used to provide an indication of an incoming long message (e.g., multiple data frames that need to be reconstructed by the receiving A2B manager).

FIG. 4B illustrates an example of long message header frame 440. In some aspects, long message header frame 440 can include two bits that identify frame 440 as a long message header frame (e.g., field 442 and field 444 can be set to a value of '10'). In some examples, long message header frame 440 can include a message type field 446, a message size field 448, a header cyclic redundancy check (CRC) field 450, and a message CRC 452. In some instances, message CRC field 452 can be used to protect data integrity of the payload of message header frame 440. In some cases, header CRC field 450 can be used to protect data integrity of the message type 446, message size 448, and the payload CRC 452.

Figure 4C:
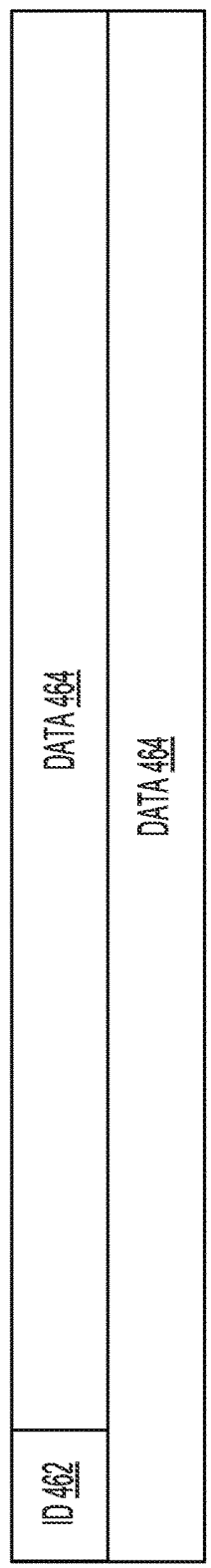

FIG. 4C illustrates an example of data frame 460. In some aspects, data frame 460 can include a first bit that can be used to identify the frame as a data frame. For example, field 462 can be set to a value of '0' to identify data frame 460. In some cases, data frame 460 can include data field 464 which can encompass the remaining bits (e.g., 31 bits) of data frame 460.

Returning to FIG. 3, at action 320, A2B manager 304 can begin transmission of the fragmented data over an A2B interface by sending a start message. In some aspects, the start message can include long message header frame 440. After sending the start message, A2B manager 304 can send multiple data packets (e.g., data frame 460). For example, at action 322, 324, and 326 the A2B manager 302 can send the payload of the data transmission using three data frame transmissions over an A2B interface.

At action 328, A2B manager 306 can reconstruct the data transmission based on the information received in the long message header frame (e.g., start message 320) and the fragmented data received in each of the data frame transmissions (e.g., data message 322, data message 324, and data message 326).

At action 330, A2B manager 306 can receive a read command from A2B client 308. In some cases, the read command from A2B client 308 may be received prior to reception of the data messages. At action 332, A2B manager 306 can respond to the read command by returning the reconstructed data message received from A2B manager 304. In some cases, the reconstructed data can be stored in a data buffer that is returned based on the read command. In some examples, A2B manager 306 may send data to A2B client 308 based on a data type associated with the data transmission (e.g., a data type obtained from field 446 in long message header frame 440). For example, A2B client 308 may send a connection or registration message to A2B manager 306 for subscribing to a particular message type. In some examples, messages having a message type that matches a request from an A2B client can be forwarded to the A2B client without a read command.

Figure 5:
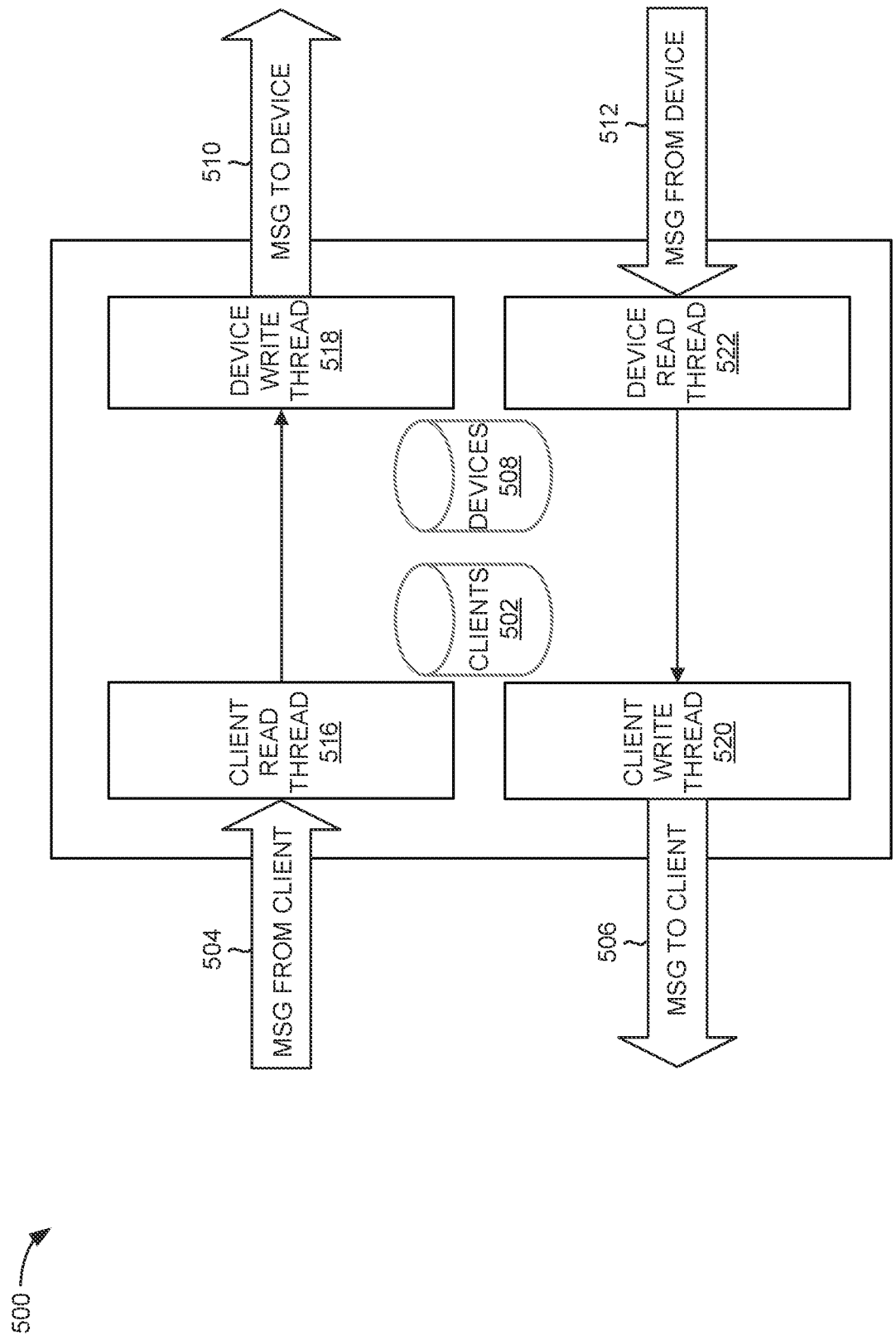
FIG. 5 is a diagram illustrating an example of interfaces implemented by an automotive audio bus manager, in accordance with some examples of the present disclosure.

FIG. 5 illustrates an example interface diagram for an automotive audio bus (A2B) manager 500. In some aspects, A2B manager 500 can implement client read thread 516 and client write thread 520 for interfacing with clients 502. In some cases, A2B manager 500 can implement device write thread 518 and device read thread 522.

In some instances, client read thread 516 can receive message 504 from a client. In some examples, A2B manager 500 can forward message 504 from client read thread 516 to device write thread 518. In some aspects, device write thread 518 can fragment the data and generate the long message header frame (e.g., header frame 440) and/or the data frames (e.g., data frame 460) for transmission over the A2B interface. For example, device write thread 518 can transmit message 510 to an A2B device (e.g., devices 508).

In some cases, device read thread 522 can receive message 512 from an A2B device (e.g., devices 508). In some examples, device read thread 522 can reconstruct the data (e.g., based on the long header frame and one or more data frames). In some instances, device read thread 522 can forward the reconstructed data message to client write thread 520. In some aspects, client write thread 520 can send message 506 to one or or more clients (e.g., clients 502).

Figure 6:
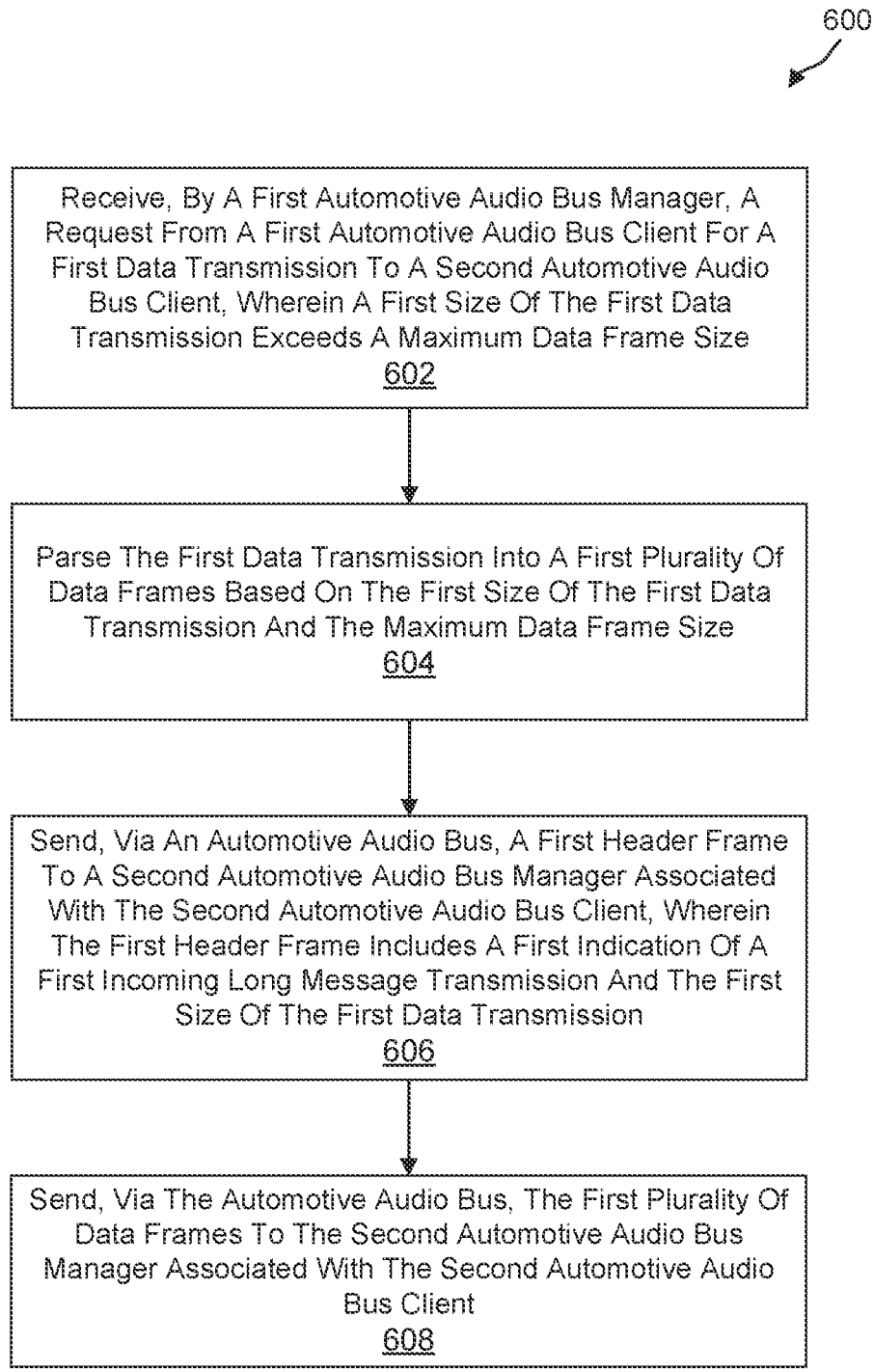
FIG. 6 is a flowchart illustrating an example process for performing communications using an automotive audio bus, in accordance with some examples of the present disclosure.

FIG. 6 illustrates an example of a process 600 for simulating movement of an articulated vehicle. At block 602, the process 600 includes receiving, by a first automotive audio bus manager, a request from a first automotive audio bus client for a first data transmission to a second automotive audio bus client, wherein a first size of the first data transmission exceeds a maximum data frame size. For example, A2B manager 206 can receive a request from a client 202 for a data transmission to client 216. In some aspects, the size of the data transmission can exceed a maximum data frame size. In some examples, the maximum data frame size can be 32 bits. In some cases, the maximum data payload size for a condensed message frame (e.g., frame 400) can be 23 bits. In some aspects, the maximum data frame size can correspond to a maximum size associated with an A2B mailbox.

In some cases, the request for the first data transmission can correspond to an ethernet frame. For example, a data transmission from a customer facing wireless module (CFWM) can be sent to A2B manager 206 as an ethernet frame that is subsequently deconstructed and forwarded over A2B interface using a plurality of data frames.

At block 604, the process 600 includes parsing the first data transmission into a first plurality of data frames based on the first size of the first data transmission and the maximum data frame size. For example, A2B manager 206 can parse or fragment the data transmission into a plurality of data frames (e.g., data frames 460).

At block 606, the process 600 includes sending, via an automotive audio bus, a first header frame to a second automotive audio bus manager associated with the second automotive audio bus client, wherein the first header frame includes a first indication of a first incoming long message transmission and the first size of the first data transmission. For instances, A2B manager 206 can send a header frame (e.g., long message header frame 440) to A2B manager 212, which is associated with client 216. In some aspects, the header can include an indication of an incoming long message transmission (e.g., fields 442 and 444 of long message header frame 440). In some cases, the header can include the size of the data transmission (e.g., message size 448 of long message header frame 440).

At block 608, the process 600 includes sending, via the automotive audio bus, the first plurality of data frames to the second automotive audio bus manager associated with the second automotive audio bus client. For example, A2B manager 206 can send the plurality of data frames to A2B manager 212 using the A2B interface (e.g., via one or more A2B transceivers 208 and/or 210).

In some aspects, the first automotive audio bus client corresponds to an edge device diagnostic framework (EDDF) and the first automotive audio bus manager corresponds to a customer facing wireless module (CFWM). For example, client 202 may correspond to an EDDF and A2B manager 206 may correspond to a CFWM.

In some cases, wherein the second automotive audio bus manager corresponds to a telematics and network gateway (TANG). For instance, the A2B manager 212 can correspond to a TANG. In some examples, the automotive audio bus can correspond to a two-wire bidirectional interface. In some aspects, the automotive audio bus provides connectivity among a plurality of devices in an autonomous vehicle. For instance, the automotive audio bus can provide connectivity among a plurality of devices in AV 102.

In some examples, the process 600 can include receiving, via the automotive audio bus, a second header frame from the second automotive audio bus manager, wherein the second header frame includes a second indication of a second incoming long message transmission and a second size of a second data transmission. For example, A2B manager 206 can receive a second header frame from A2B 212 that includes an indication of an incoming long message transmission.

In some cases, the process 600 can include receiving, via the automotive audio bus, a second plurality of data frames from the second automotive audio bus manager, wherein the second plurality of data frames correspond to the second incoming long message transmission. For instances, A2B 206 may receive a plurality of data frames via the A2B interface that correspond to the incoming long message transmission indicated in the header frame.

In some instances, the process 600 can include combining the second plurality of data frames to yield the second data transmission and sending the second data transmission to the first automotive audio bus client. For example, A2B manager 206 can combine or reconstruct the data using the information from the header frame and the data fragments from the plurality of data frames. A2B manager 206 may then forward the reconstructed data to clients 202.

In some aspects, the process 600 can include identifying the first automotive audio bus client as a recipient of the second data transmission based on a message type identifier included in the second header frame. For example, A2B manager 206 may identify one or more clients 202 that have requested to receive the data transmission based on the message type indicated in the header frame (e.g., message type field 446 in long message header frame 440). In some cases, a message type may correspond to a diagnostic message, a manufacturing trace data message, a software update acknowledgment message (e.g., an ACK), a software update failure message (e.g., a negative acknowledgment (NACK)), a return acknowledgment message, a user-defined message, and/or any other type of message.

Figure 7:
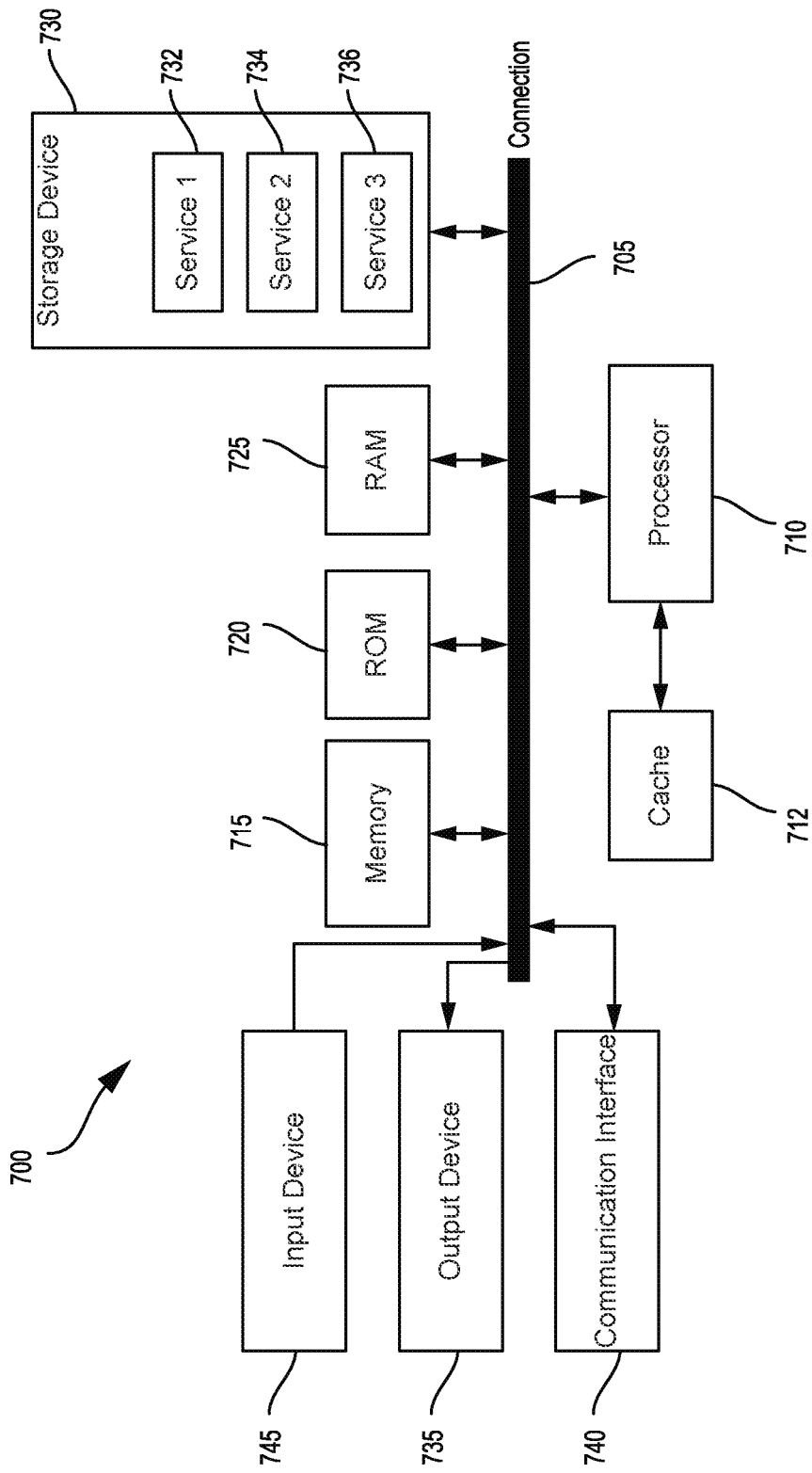
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up internal computing system 110, remote computing system 190, a passenger device executing the ridesharing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L#), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

SELECTED EXAMPLES

Illustrative examples of the disclosure include:

Aspect 1. A method comprising: receiving, by a first automotive audio bus manager, a request from a first automotive audio bus client for a first data transmission to a second automotive audio bus client, wherein a first size of the first data transmission exceeds a maximum data frame size; parsing the first data transmission into a first plurality of data frames based on the first size of the first data transmission and the maximum data frame size; sending, via an automotive audio bus, a first header frame to a second automotive audio bus manager associated with the second automotive audio bus client, wherein the first header frame includes a first indication of a first incoming long message transmission and the first size of the first data transmission; and sending, via the automotive audio bus, the first plurality of data frames to the second automotive audio bus manager associated with the second automotive audio bus client.

Aspect 2. The method of Aspect 1, further comprising: receiving, via the automotive audio bus, a second header frame from the second automotive audio bus manager, wherein the second header frame includes a second indication of a second incoming long message transmission and a second size of a second data transmission; receiving, via the automotive audio bus, a second plurality of data frames from the second automotive audio bus manager, wherein the second plurality of data frames correspond to the second incoming long message transmission; combining the second plurality of data frames to yield the second data transmission; and sending the second data transmission to the first automotive audio bus client.

Aspect 3. The method of Aspect 2, further comprising: identifying the first automotive audio bus client as a recipient of the second data transmission based on a message type identifier included in the second header frame.

Aspect 4. The method of any of Aspects 1 to 3, wherein the request for the first data transmission corresponds to an ethernet frame.

Aspect 5. The method of any of Aspects 1 to 4, wherein the first automotive audio bus client corresponds to an edge device diagnostic framework (EDDF) and the first automotive audio bus manager corresponds to a customer facing wireless module (CFWM).

Aspect 6. The method of any of Aspects 1 to 5, wherein the second automotive audio bus manager corresponds to a telematics and network gateway (TANG).

Aspect 7. The method of any of Aspects 1 to 6, wherein the automotive audio bus corresponds to a two-wire bidirectional interface.

Aspect 8. The method of any of Aspects 1 to 7, wherein the automotive audio bus provides connectivity among a plurality of devices in an autonomous vehicle.

Aspect 9. An apparatus comprising: at least one memory; and at least one processor coupled to the at least one memory, wherein the at least one processor is configured to perform operations in accordance with any one of Aspects 1 to 8.

Aspect 10: An apparatus comprising means for performing operations in accordance with any one of Aspects 1 to 8.

Aspect 11: A non-transitory computer-readable medium comprising instructions that, when executed by an apparatus, cause the apparatus to perform operations in accordance with any one of Aspects 1 to 8.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
receiving, by a first automotive audio bus manager, a request from a first automotive audio bus client for a first data transmission to a second automotive audio bus client, wherein a first size of the first data transmission exceeds a maximum data frame size;

parsing the first data transmission into a first plurality of data frames based on the first size of the first data transmission and the maximum data frame size;

sending, via an automotive audio bus, a first header frame to a second automotive audio bus manager associated with the second automotive audio bus client, wherein the first header frame includes a first indication of a first incoming long message transmission and the first size of the first data transmission; and sending, via the automotive audio bus, the first plurality of data frames to the second automotive audio bus manager associated with the second automotive audio bus client, wherein the automotive audio bus corresponds to a two-wire bidirectional interface.

2. The method of claim 1, further comprising:

receiving, via the automotive audio bus, a second header frame from the second automotive audio bus manager, wherein the second header frame includes a second indication of a second incoming long message transmission and a second size of a second data transmission;

receiving, via the automotive audio bus, a second plurality of data frames from the second automotive audio bus manager, wherein the second plurality of data frames correspond to the second incoming long message transmission;

combining the second plurality of data frames to yield the second data transmission; and sending the second data transmission to the first automotive audio bus client via the second automotive audio bus manager.

3. The method of claim 2, further comprising:

identifying the first automotive audio bus client as a recipient of the second data transmission based on a message type identifier included in the second header frame.

4. The method of claim 1, wherein the request for the first data transmission corresponds to an ethernet frame.

5. The method of claim 1, wherein the automotive audio bus provides connectivity among a plurality of devices in an autonomous vehicle.

6. An apparatus comprising:

at least one memory comprising instructions; and at least one processor configured to execute the instructions and cause the apparatus to:

receive a request from a first automotive audio bus client for a first data transmission to a second automotive audio bus client, wherein a first size of the first data transmission exceeds a maximum data frame size;

parse the first data transmission into a first plurality of data frames based on the first size of the first data transmission and the maximum data frame size;

send a first header frame to an automotive audio bus manager associated with the second automotive audio bus client, wherein the first header frame includes a first indication of a first incoming long message transmission and the first size of the first data transmission; and send the first plurality of data frames to the automotive audio bus manager associated with the second automotive audio bus client, wherein the apparatus is configured to operate in an autonomous vehicle.

7. The apparatus of claim 6, wherein the at least one processor is further configured to cause the apparatus to:

receive a second header frame from the automotive audio bus manager, wherein the second header frame includes a second indication of a second incoming long message transmission and a second size of a second data transmission;

receiving a second plurality of data frames from the automotive audio bus manager, wherein the second plurality of data frames correspond to the second incoming long message transmission;

combine the second plurality of data frames to yield the second data transmission; and send the second data transmission to the first automotive audio bus client via the second automotive audio bus manager.

8. The apparatus of claim 7, wherein the at least one processor is further configured to cause the apparatus to:

identify the first automotive audio bus client as a recipient of the second data transmission based on a message type identifier included in the second header frame.

9. The apparatus of claim 6, wherein the request for the first data transmission corresponds to an ethernet frame.

10. A non-transitory computer-readable storage medium having stored thereon instructions which, when executed by one or more processors, cause the one or more processors to:

receive, by a first automotive audio bus manager, a request from a first automotive audio bus client for a first data transmission to a second automotive audio bus client, wherein a first size of the first data transmission exceeds a maximum data frame size;

parse the first data transmission into a first plurality of data frames based on the first size of the first data transmission and the maximum data frame size;

send a first header frame to a second automotive audio bus manager associated with the second automotive audio bus client, wherein the first header frame includes a first indication of a first incoming long message transmission and the first size of the first data transmission; and send the first plurality of data frames to the second automotive audio bus manager associated with the second automotive audio bus client, wherein the automotive audio bus corresponds to a two-wire bidirectional interface.

11. The non-transitory computer-readable storage medium of claim 10, comprising further instructions which, when executed by the one or more processors, cause the one or more processors to:

receive a second header frame from the second automotive audio bus manager, wherein the second header frame includes a second indication of a second incoming long message transmission and a second size of a second data transmission;

receiving a second plurality of data frames from the second automotive audio bus manager, wherein the second plurality of data frames correspond to the second incoming long message transmission;

combine the second plurality of data frames to yield the second data transmission; and send the second data transmission to the first automotive audio bus client via the second automotive audio bus manager.

12. The non-transitory computer-readable storage medium of claim 11, comprising further instructions which, when executed by the one or more processors, cause the one or more processors to:

identify the first automotive audio bus client as a recipient of the second data transmission based on a message type identifier included in the second header frame.

\* \* \* \* \*